United States Patent [19]

Hajto

[11] Patent Number: 4,986,565
[45] Date of Patent: Jan. 22, 1991

[54] WHEEL SUSPENSION SYSTEM FOR VEHICLES

[75] Inventor: Jenö Hajto, Munich, Fed. Rep. of Germany

[73] Assignee: Bayerische Motoren Werke AG, Fed. Rep. of Germany

[21] Appl. No.: 454,930

[22] Filed: Dec. 22, 1989

[30] Foreign Application Priority Data

Dec. 23, 1988 [DE] Fed. Rep. of Germany ....... 3843612

[51] Int. Cl.$^5$ .......................... B60G 3/00; B60G 13/08
[52] U.S. Cl. ..................................... 280/667; 280/696; 280/701
[58] Field of Search ................. 280/667, 668, 696, 701

[56] References Cited

U.S. PATENT DOCUMENTS

| | | | |
|---|---|---|---|
| 2,907,578 | 10/1959 | Taber | 280/667 |
| 3,068,022 | 12/1962 | Fiala | 280/667 |
| 3,940,160 | 2/1976 | Damon | 280/696 |
| 4,377,298 | 3/1983 | Finn et al. | 280/667 |
| 4,911,466 | 3/1990 | Blair | 280/696 |

Primary Examiner—Kenneth R. Rice
Attorney, Agent, or Firm—Evenson, Wands, Edwards, Lenahan & McKeown

[57] ABSTRACT

In the case of previously known double-wishbone axles, it is difficult to achieve a sufficient longitudinal springiness required for the rolling comfort because, as a result of the longitudinal force occurring during the braking operation, the wheel carrier is "wound up", so that, in lateral view, a strong twisting occurs of the steering axis. Also, no optimization has been possible of the wheel suspension kinematics as well as of the steering geometry. The new wheel suspension system has the purpose of eliminating these disadvantages. For this purpose, in the case of a double-wishbone axle, a shock absorber tube is pivotably connected with a lower wishbone. An upper wishbone is connected by means of an arm with the shock absorber tube which is aligned approximately in parallel with respect to the longitudinal direction of the vehicle and, on the one hand, is fixedly connected with the shock absorber tube and, on the other hand, is connected by way of a pivot with the upper wishbone.

18 Claims, 3 Drawing Sheets

WHEEL SUSPENSION SYSTEM FOR VEHICLES

BACKGROUND AND SUMMARY OF THE INVENTION

The invention relates to a wheel suspension system for vehicles having a wheel carrier supported at a vehicle body or the like by pivotally connected upper and lower wishbone units.

Double-wishbone axles are known which comprise an upper and a lower wishbone which each are pivotally connected with a wheel carrier carrying the wheel at their wheel side end and are pivotally connected with the body at their body side end. A spring is disposed between the pair of wishbones which encloses a hydraulic shock absorber and which elastically supports the lower wishbone with respect to the body. However, such double-wishbone axles have the disadvantage that the longitudinal springing, which is required for the rolling comfort, is difficult to achieve because as a result, during a braking operation, a "wind-up" of the wheel carrier is generated and, in addition, there is considerable twisting of the steering axis.

Furthermore, spring strut type axles are known which comprise a lower wishbone and a spring strut which is pivotally connected with it. In this construction, the steering knuckle, on which the wheel is disposed, is fixedly connected with the lower part of the spring strut. Steering causes the turning of the whole spring strut which on the top and on the bottom is movably connected with the body and with the lower wishbone. A coil spring surrounds the upper part of the spring strut which is combined with a telescopic shock absorber. In the case of such spring strut type axles, high side forces occur at the shock absorber tube which cause increased friction between the sliding parts of the shock absorber strut, increasing the breakaway forces during the compression and the rebound and thus impairing the suspension comfort. Also, in the case of spring strut type axles of this type, the wheel suspension kinematics are coupled with the steering geometry so that an optimization is difficult.

It is an object of the invention to provide a wheel suspension system of the above-mentioned type which has an improved longitudinal springing, less windup of the wheel carrier during braking and permits an optimizing of the steering geometry and of the wheel suspension kinematics.

According to preferred embodiments of the invention, this object is achieved by providing a wheel suspension system wherein a shock absorber tube is connected with its lower end by way of a pivot with the lower wishbone, the upper end of the shock absorber tube supporting itself at the vehicle body or the like, and wherein the upper wishbone is connected by way of an arm with the shock absorber.

In the case of the wheel suspension system according to the invention, no side forces occur at the shock absorber tube during the normal driving operation, so that the breakaway forces remain low. It is also an advantage that the wheel suspension system according to the invention has a low overall height. The pivotal connection of the upper wishbone on the body side can be carried out in a simple manner because it must support only a small part of a braking torque.

When a lower wishbone is used in the double-pivot construction which has an imaginary steering point, relatively large brake disks may also be implemented.

Other objects, advantages and novel features of the present invention will become apparent from the following detailed description of the invention when considered in conjunction with the accompanying drawings.

DETAILED DESCRIPTION OF THE DRAWINGS

Figure 1:
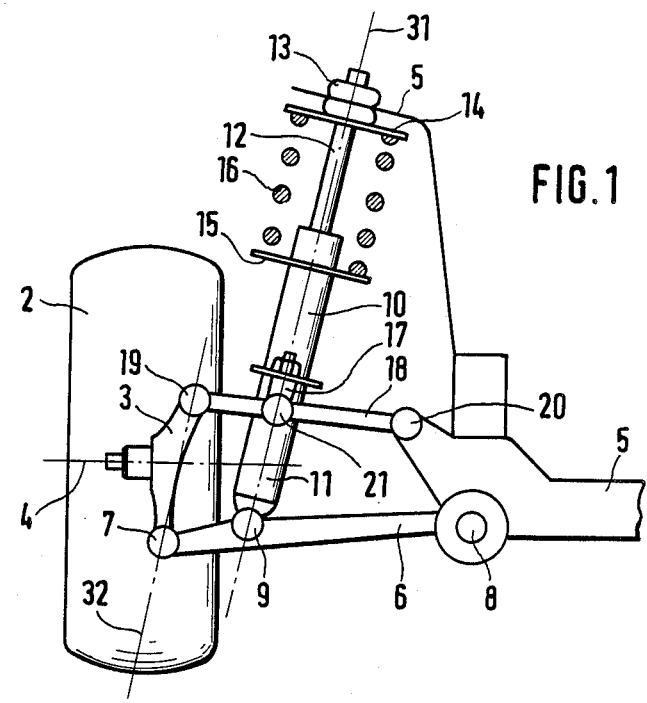
FIG. 1 is a partially schematic view from the rear in driving direction of a wheel suspension system having a lower wishbone in a single-pivot construction, constructed according to a preferred embodiment of the invention.
Figure 2:
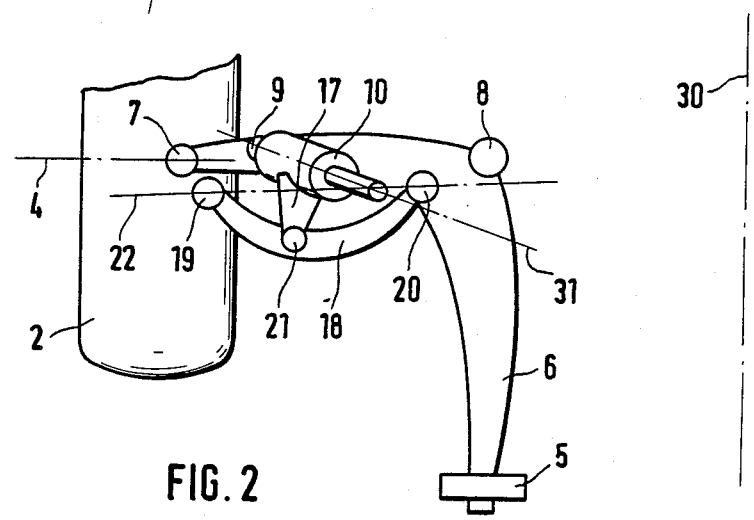
FIG. 2 is a schematic top view of the wheel suspension system shown in FIG. 1.

In FIGS. 1 and 2, a wheel suspension system 1 is shown which represents a double-wishbone axle in the single-pivot construction. A wheel 2 is carried by means of a wheel carrier 3 which is connected by means of pivots 19, 7 with respective upper and lower wishbones 18, 6. The wishbones 18, 6 are respectively connected with a vehicle body 5 by way of pivots 20, 8. A spring strut 10 comprising a shock absorber tube 11 and a piston rod 12 as well as a coil spring 16 arranged between spring plates 14 and 15 is supported on the lower wishbone 6 by way of a pivot 9. The spring strut 10 is pivotally arranged at the body 5 by way of a support 13. At the level of the upper wishbone 18, an arm 17 is fixedly arranged at the shock absorber tube 11 and is connected with the upper wishbone 18 by way of a pivot 21.

FIG. 2 shows the curved shape of the upper wishbone 18. The upper wishbone 18 is curved in such a manner that a connecting line 22 between pivot 19 and pivot 20 extends approximately through the shock absorber tube axis 31 or the bisecting line of the spring strut 10. The upper wishbone 18 can therefore be pivoted around the connecting line 22. As a result, the vertical relative movements between the upper wishbone and the shock absorber tube 11 which occur during the compression and rebound cause a rocking motion of the wishbone 18 around the connecting line 22. As a result of this rocking motion, no forces are transmitted by the wishbone 18 in vertical direction to the shock absorber tube 11. As a result, the shock absorber tube 11 of the spring strut 10 is disposed such that during horizontal relative movements between the wishbone 18 and the shock absorber tube 11 it rotates around its axis 31.

Figure 3:
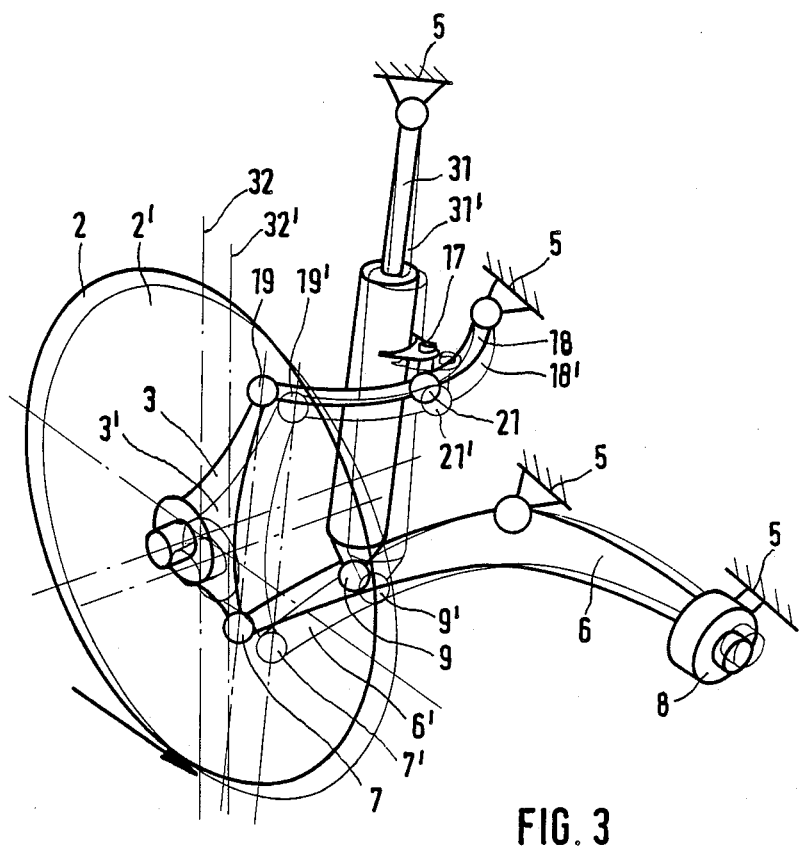
FIG. 3 is a perspective schematic view of the embodiment shown in FIGS. 1 and 2.

FIG. 3 shows the shifting of the steering axis which occurs during the braking operation and is parallel to the largest degree. In this case, the thicker drawn-out lines represent the original position, while the thinner dash lines show the new position. The corresponding reference numbers of the parts shifted into the new position are provided with an apostrophe. In the case of the known double-wishbone axles, during the braking operation, the pivot of the lower wishbone arranged at the wheel carrier circles toward the rear; i e., opposite to the driving direction, while the pivot of the upper wishbone arranged at the wheel carrier circles toward the front. As a result of this wind-up effect, the caster angle and the caster offset are therefore changed considerably. In the case of the present wheel suspension system 1, no shifting of the height of pivots 19, 7; 19, 24 and 27 of the upper and lower wishbones 18, 6; 18, 23 and 26 takes place, as this is the case in the state of the art, because the "wind-up moment" occurring at the wishbones is supported by the shock absorber tube 11. Because of the assignment of the wishbones with respect to one another which is determined by means of the shock absorber tube 11 and the arm 17, during the braking operation, a translational movement occurs toward the rear while the steering geometry is maintained to the largest extent. As mentioned above, the translational shifting takes place in the case of a double-wishbone axle in the single-pivot construction as well as in the case of a double-wishbone axle in the double-pivot construction.

The side forces and vertical forces acting in the wheel contact point are supported by the wishbones so that the shock absorber tube is not stressed with respect to bending. As a result, during the normal driving operation and during cornering, no side force is generated in the direction of the vehicle axle 4 at the shock absorber tube 11, whereby the breakaway forces are kept low. The pivotal connection of the upper wishbone 18 on the body side by way of pivot 20 is simple to carry out since this pivot must support only a small part of the braking torque.

As a rule, pivot 9 and pivot 21 will be constructed as a ball joint. In addition, the lower wishbone also usually has an elastic bearing.

Figure 4:
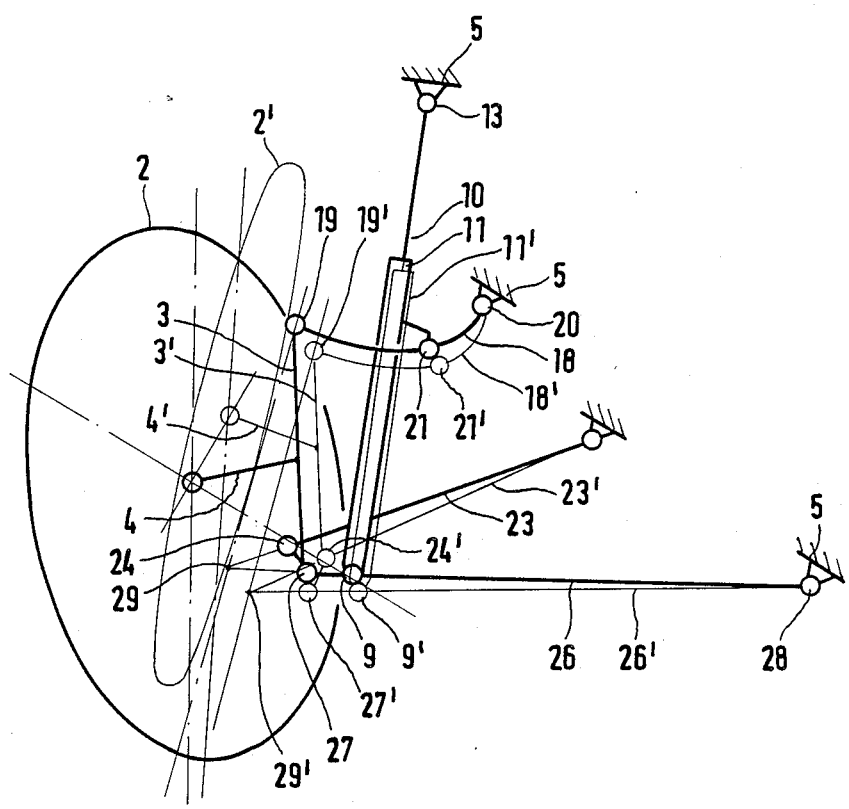
FIG. 4 is a perspective view of a wheel suspension system in the direction of the longitudinal axis of the vehicle, having a lower wishbone in the double-pivot construction, constructed according to another embodiment of the invention.

The embodiment shown in FIG. 4 differs from the embodiment shown in FIGS. 1, 2 and 3 in that, instead of a single lower wishbone 6, two wishbone links 23 and 26, by way of one pivot 24 and 27 respectively, are connected with the wheel carrier 3. By using two wishbone links, it is possible to shift the imaginary steering axis 33 far into the wheel disk without any impairment there of the installation of, for example, a sufficiently dimensioned brake. The imaginary steering axis 33 is obtained from an intersecting point 29 of the imaginary extension of wishbone links 23 and 26, i.e., the imaginary steering point, and the pivot 19 of the upper wishbone 18.

In the embodiment shown in FIG. 4, the disadvantage of large caster change occurring at the wheel which is on the outside when cornering is avoided. This caster change occurs in the case of the known double-wishbone axles with two individual links at the bottom and one A-arm at the top. While, during the steering operation, in the case of the known double-wishbone axles, the intersecting point of the two lower wishbone axles shifts and the upper link point, on the side of the wheel, remains where it is, the lower wishbone link 26, during the steering, moves the shock absorber tube 11 along with it, whereby the upper wishbone 18 is taken along by means of the arm 17. In this manner, the steering axis is shifted approximately in parallel so that the caster is essentially maintained. This sequence of movements is shown in FIG. 4 where the thicker drawn-out lines show the original position and the thinner drawn-out lines show the new position. In addition, the corresponding reference numbers of the parts shifted into the new position are provided with an apostrophe.

An optimization of the steering geometry and the wheel suspension kinematics is made possible by a separation of the wheel suspension kinematics from the steering geometry. This is achieved in that the steering motion of the embodiments of FIGS. 1, 2 and 3 takes place around a steering axis 32 which is formed by the upper and lower pivotal connecting points of the wishbones, while the steering motion of the embodiment of FIG. 4 takes place around the imaginary steering axis 33. The spring strut itself has no steering function and can therefore be placed toward the inside, in order to obtain a low hood line. The wheel suspension system is also suitable for four-wheel drives because the disturbing-force lever arm, i.e., the horizontal distance between the wheel center and the steering axis, can be kept small. Considerable coordinating possibilities are obtained by the separation of the wheel suspension from the steering.

In addition to the embodiments of the combined arrangement of the shock absorber tube with a spring shown in the figures, a separate arrangement is also possible according to other contemplated embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A wheel suspension system for a vehicle comprising:
   a wheel carrier carrying a wheel, and
   an upper and a lower wishbone respectively pivotably connected to the wheel carrier and with a vehicle body or the like at opposite ends,
   wherein a shock absorber tube is connected with its lower end by way of a pivot with the lower wishbone, the upper end of the shock absorber tube 11 supporting itself at the vehicle body or the like, and
   wherein the upper wishbone is connected by way of an arm, is connected with the shock absorber tube.

2. A wheel suspension system according to claim 1, wherein the arm is aligned approximately in parallel with respect to the longitudinal direction of the vehicle and, on the one hand, is fixedly connected with the shock absorber tube and, on the other hand, is connected with the upper wishbone by way of a pivot.

3. A wheel suspension system according to claim 1, wherein a connecting line extending through the pivots of the upper wishbone extends as closely as possible to the shock absorber tube axis or intersects it.

4. A wheel suspension system according to claim 2, wherein a connecting line extending through the pivots of the upper wishbone extends as closely as possible to the shock absorber tube axis or intersects it.

5. A wheel suspension system according to claim 3, wherein the upper wishbone can be swivelled around the connecting line during vertical relative movements between the wishbone and the shock absorber tube.

6. A wheel suspension system according to claim 4, wherein the upper wishbone can be swivelled around the connecting line during vertical relative movements between the wishbone and the shock absorber tube.

7. A wheel suspension system according to claim 1, wherein the upper wishbone is bent around the shock absorber tube in a curved manner.

8. A wheel suspension system according to claim 2, wherein the upper wishbone is bent around the shock absorber tube in a curved manner.

9. A wheel suspension system according to claim 5, wherein the upper wishbone is bent around the shock absorber tube in a curved manner.

10. A wheel suspension system according to claim 1, wherein the shock absorber tube is disposed such that, during horizontal relative movements between the upper wishbone and the shock absorber tube, it rotates around the shock absorber tube axis.

11. A wheel suspension system according to claim 2, wherein the shock absorber tube is disposed such that, during horizontal relative movements between the upper wishbone and the shock absorber tube, it rotates around the shock absorber tube axis.

12. A wheel suspension system according to claim 5, wherein the shock absorber tube is disposed such that, during horizontal relative movements between the upper wishbone and the shock absorber tube, it rotates around the shock absorber tube axis.

13. A wheel suspension system according to claim 7, wherein the shock absorber tube is disposed such that, during horizontal relative movements between the upper wishbone and the shock absorber tube, it rotates around the shock absorber tube axis.

14. A wheel suspension system according to claim 1, wherein the lower wishbone comprises two individual links, which are spaced away from one another and which are connected with the wheel carrier by means of one pivot respectively.

15. A wheel suspension system according to claim 2, wherein the lower wishbone comprises two individual links, which are spaced away from one another and which are connected with the wheel carrier by means of one pivot respectively.

16. A wheel suspension system according to claim 5, wherein the lower wishbone comprises two individual links, which are spaced away from one another and which are connected with the wheel carrier by means of one pivot respectively.

17. A wheel suspension system according to claim 7, wherein the lower wishbone comprises two individual links, which are spaced away from one another and which are connected with the wheel carrier by means of one pivot respectively.

18. A wheel suspension system according to claim 10, wherein the lower wishbone comprises two individual links, which are spaced away from one another and which are connected with the wheel carrier by means of one pivot respectively.

* * * * *